United States Patent Office 3,527,505
Patented Sept. 8, 1970

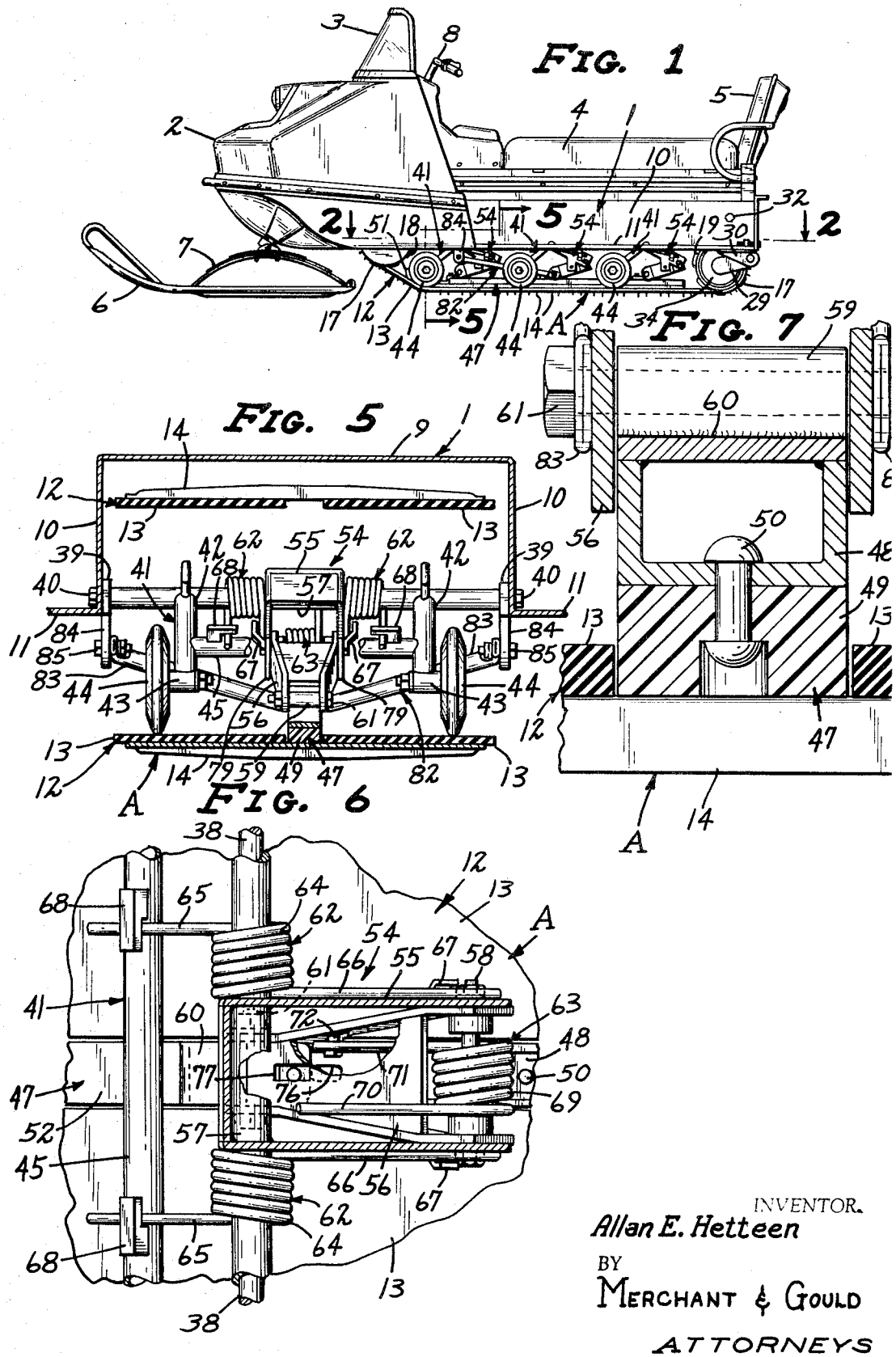

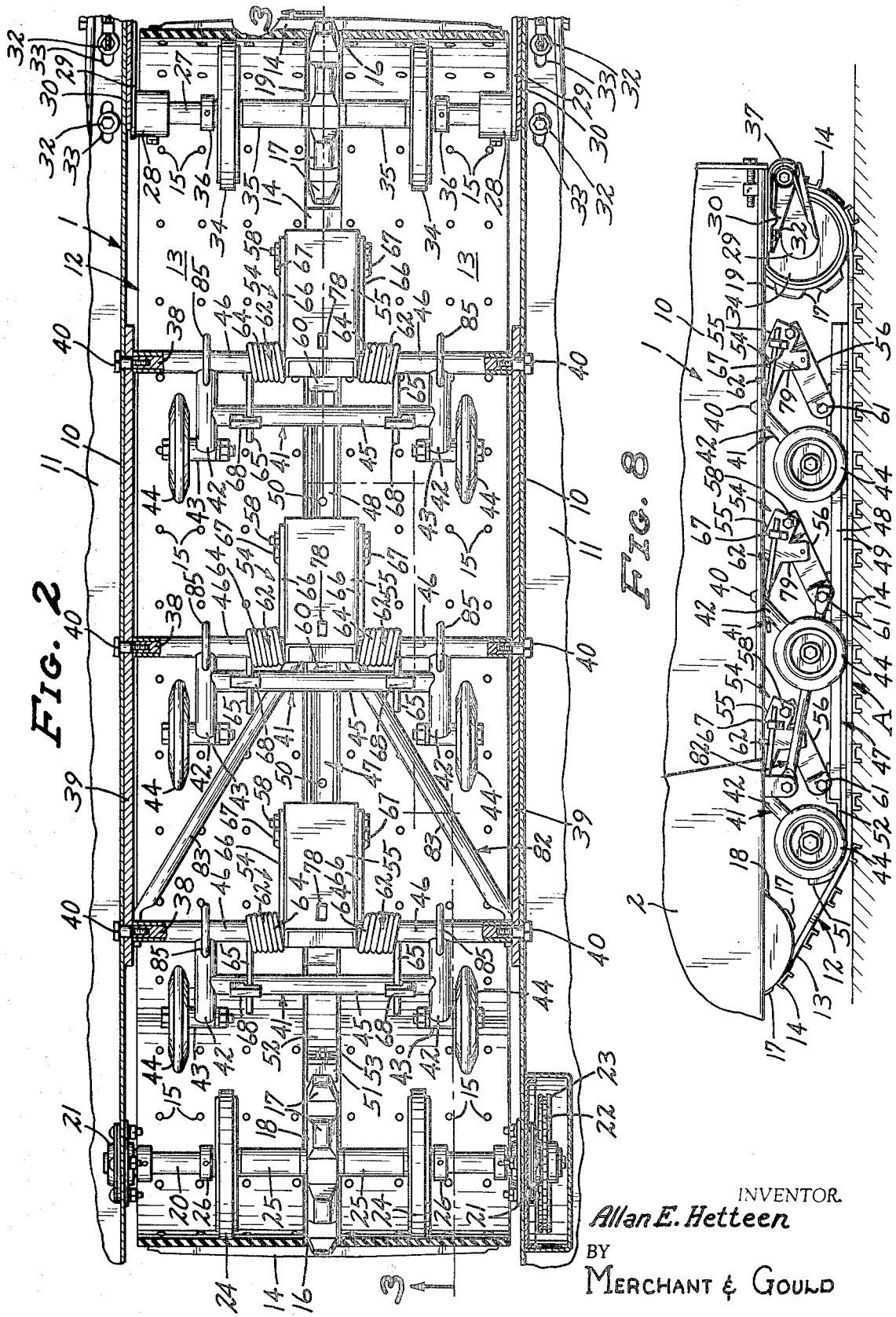

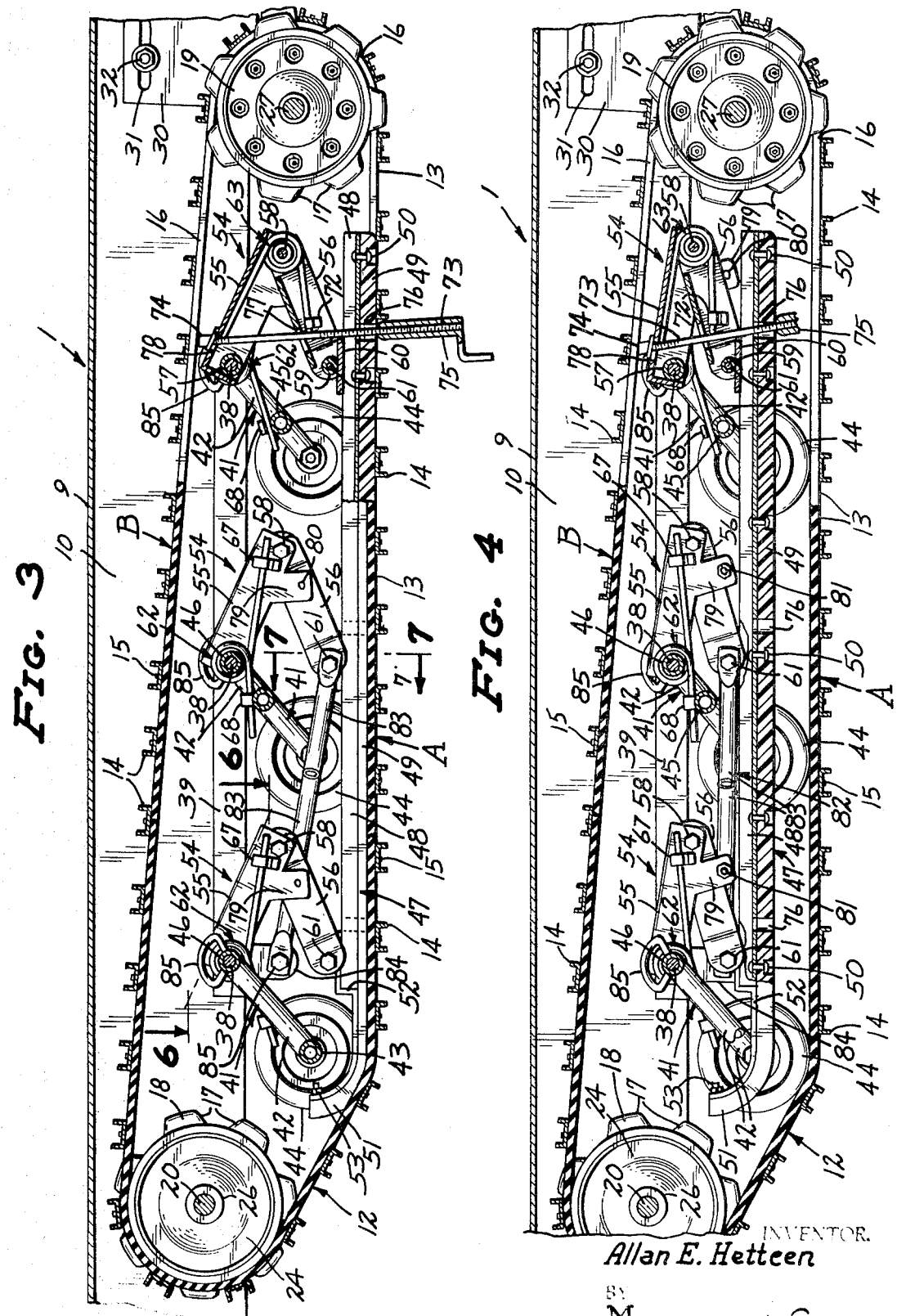

3,527,505
SNOWMOBILE TRACK SUSPENSION SYSTEM
Allan E. Hetteen, Roseau, Minn., assignor, by mesne assignments, to Textron Inc., Providence, R.I., a corporation of Delaware
Filed Jan. 24, 1969, Ser. No. 793,705
Int. Cl. B62d 55/16
U.S. Cl. 305—27                    2 Claims

ABSTRACT OF THE DISCLOSURE

A suspension system for an endless drive track utilizing both a track-engaging slide bar and a plurality of bogie wheels. Mounting means for the slide bar and bogie wheels provides for independent generally upward and downward movement of the slide bar and bogie wheels, and for raising of the slide bar out of engagement with the lower ground-engaging run of the drive track.

BACKGROUND OF THE INVENTION

Track driven vehicles, such as snowmobiles heretofore introduced, utilize either a plurality of bogie wheels to maintain the lower ground-engaging run of the endless flexible drive belt or track in substantially full driving engagement with the snow or ice, when traveling thereover, or a lower run-engaging slide bar for the same purpose. Bogie wheels, having rolling contact with the drive track are subject to considerably less wear than are slide bars, which frictionally engage the drive track. Further, on smooth surfaces such as hard packed snow or ice, bogie wheels provide for relatively comfortable riding qualities. However, when traveling over rough uneven terrain, or in deep soft snow, use of the slide bar has been found to be more satisfactory than bogie wheels. In soft snow, flexibility of the drive belt permits the lower ground-engaging run thereof to arch or bow upwardly between adjacent longitudinally spaced bogie wheels so that, in effect, each bogie wheel is tending to climb over or flatten the arched or bowed portions of the drive track, requiring greater power to drive the track.

SUMMARY OF THE INVENTION

The present invention involves a drive track suspension for a vehicle having a body structure and an endless flexible drive track, the suspension system comprising a plurality of bogie wheels disposed in spaced relationship longitudinally of the drive track and in rolling engagement with the lower ground-engaging run of the drive track, and an elongated generally horizontal slide bar extending longitudinally of the track and disposed in sliding engagement with said lower run. The bogie wheels and slide bar are mounted, by means carried by the body structure, for independent generally upward and downward movements, and yielding means bias the bogie wheels in a generally downward direction of said movement thereof to maintain the bogie wheels and slide bar in rolling and sliding engagement, respectively, with the lower run of the drive track. With the use of one or more slide bars in combination with the bogie wheels, the lower driving run of the drive track lies substantially flat on the soft snow, and the frictional losses sustained between the drive track and slide bar are more than offset by the generally flat running characteristics obtained thereby. Further, by dividing support of the vehicle between the bogie wheels and slide bar frictional wear of the slide bar is substantially less than when only slide bars are used in the suspension system.

BRIEF DESCRIPTION OF THE DRAWINGS

FIG. 1 is a view in side elevation of a snowmobile incorporating the suspension system of this invention;

FIG. 2 is an enlarged fragmentary view, partly in plan and partly in section, taken substantially on the line 2—2 of FIG. 1;

FIG. 3 is a longitudinal section taken on the irregular line 3—3 of FIG. 2;

FIG. 4 is a view corresponding to FIG. 3, but showing a different position of some of the parts;

FIG. 5, sheet 1, is an enlarged transverse section taken on the irregular line 5—5 of FIG. 1;

FIG. 6 is a fragmentary section taken substantially on the line 6—6 of FIG. 3;

FIG. 7 is an enlarged fragmentary transverse section taken on the line 7—7 of FIG. 3; and FIG. 8 is a view corresponding to a portion of FIG. 1 and enlarged to show details of construction.

DETAILED DESCRIPTION

A snow and ice traversing vehicle, commonly known as a snowmobile, is shown in FIG. 1 as comprising an elongated body structure 1 covered at its front end portion by a hood 2 on which is mounted a windshield 3. Rearwardly of the hood 2 is a seat pad 4 for the driver and one or more passengers, and a back rest 5 projects upwardly from the rear end of the body structure 1. The front end of the snowmobile is supported and steered by a pair of dirigible ski elements 6, one of which is shown in FIG. 1, the ski elements 6 being carried by leaf springs 7 and steered from the driver's seat by steering handle bars 8 and conventional steerage linkage, not shown. The hood 2 at least partially encloses an internal combustion engine, also not shown, by means of which the snowmobile is driven. The body structure 1 includes an elongated cross sectionally channel-shaped body member having a horizontally disposed top wall 9, laterally spaced vertical sidewalls 10 and laterally outwardly projecting longitudinal side flanges 11 which provides foot rests for the driver and passengers.

The snowmobile is propelled by one or more endless flexible drive tracks which cooperate with the skis 6 to support the vehicle. For the purpose of the present example, a single drive track is shown and indicated generally at 12. The drive track 12 comprises a pair of laterally spaced endless belts 13 preferably made from woven fabric impregnated rubber or similar material, the belts 13 being connected by a plurality of longitudinally spaced transverse cleats 14 riveted or otherwise rigidly secured to the belts 13 by rivets or like fasteners 15. The cleats 14 are cross-sectionally channel-shaped and cooperate with the adjacent inner edges of the belts 13 to define longitudinally spaced openings 16 for reception of the teeth 17 of a pair of drive and idler sprocket wheels 18 and 19 respectively. The drive sprocket 18 is rigidly mounted on a drive shaft 20 journalled at its opposite end portions in bearings 21 bolted or otherwise rigidly secured to the sidewalls 10 of the body structure 1. The drive shaft 20 is provided at one end with a sprocket wheel 22 over which is entrained a drive chain 23 which may be assumed to be operatively connected to the engine contained within the hood 2 by suitable driving mechanism, not shown. Also, mounted on the shaft 20 are a pair of axially spaced support wheels 24 disposed between opposite sides of the drive sprocket 18 and the adjacent bearings 21, see FIG. 2. The support wheels 24 are held in predetermined axially spaced relationship to the drive sprocket 18 by tubular spacers 25 and stop collars 26.

The idler sprocket 19 is journalled on a horizontally disposed transverse idler shaft 27 that is mounted at its opposite ends in retainers 28 rigidly mounted on the front end of a pair of support legs 29 that are pivotally mounted at their rear ends to mounting brackets 30 that are longitudinally adjustably mounted on the body structure sidewalls 10 and flanges 11 adjacent the rear end of the body structure 1. As shown in FIGS. 2–4, the brackets 30 are provided with elongated slots 31 for reception of nut-equipped mounting bolts 32, the flanges 11 being likewise provided with elongated slots 33 for reception of other mounting bolts 32 by means of which the brackets 30 are adjustably mounted. The idler shaft 57 also journals a pair of axially spaced rear support wheels 34 preferably disposed in alignment with respective ones of the front support wheels 24 and held against axial movement by tubular spacers 35 and stop collars 36 on shaft 27. A pair of torsion springs 37, one of which is shown in FIG. 8, yieldingly urge the legs 29 and parts carried thereby in a downward direction relative to the body structure 1 to aid in cushioning the load carried by the vehicle.

The suspension system of this invention comprises a plurality of generally horizontal mounting shafts 38 disposed in spaced parallel relationship longitudinally of the body structure 1, and parts carried thereby, now to be described. The shafts 38 are rigidly secured at their opposed ends of the sidewalls 10 and to a pair of longitudinally extending reinforcing bars 39 engaging the sidewalls 10, by mounting bolts 40 screw threaded into opposite ends of the traverse mounting shafts 38, see FIG. 2. Each of the transverse shafts 38 carries arm structure 41 including a pair of laterally spaced parallel forwardly and downwardly sloping arms 42 having lower forward bearing portions 43 in which are mounted bogie wheels 44. The arms 42 of each pair are rigidly connected by a cross bar 45, and at their upper rear ends are provided with tubular bearing portions 46 that pivotally encompass their respective transverse mounting shaft 38. With reference to FIGS. 3 and 4, it will be seen that the drive track 12 defines a lower ground-engaging drive run A and an upper return run B, the bogie wheels 44 of each pair thereof having rolling engagement with the top or inner surface of the ground-engaging drive run A. It will be appreciated that, if desired, each arm structure 41 may be arranged to journal more than one pair of bogie wheels 44 in engagement with the lower run A.

An elongated slide bar or rail 47 extends longitudinally of the drive track 12, intermediate the lower and upper flights or runs A and B thereof, and comprises an upper backing or supporting bar section 48 of wood or, as shown, metal channel, and a lower slide or wear section 49 secured to the backing section 48 by longitudinally spaced rivets 50 or other suitable fastening means. The wear section 49 is preferably of such material as Teflon or high density polyurethane having with the metallic cleats or ribs 14 a low coefficient of friction. As shown particularly in FIGS. 3 and 4, the wear section 49 extends forwardly of the front end of the backing section 48 to provide a forwardly and upwardly curved front end portion 51 that is braced by a strap-like brace member 52 welded at its rear end to the front end of the backing section 48 and bolted at its front end to the upwardly curved front end portion 51 of the slide or wear section 49, as indicated at 53. The slide bar 47 is disposed intermediate cooperating pairs or sets of bogie wheels 44 in substantial alignment with the drive and idler sprockets 18 and 19, the slide section 49 being adapted to slidably engage the ribs or cleats 14 of the lower drive track A between the adjacent inner longitudinal edges of the drive belts 13. The slide bar 47 is operatively coupled to each of the transverse shafts 37 by a plurality of supporting legs 54 each comprising an upper leg section 55 and a lower leg section 56. The leg sections 55 and 56 are cross-sectionally channel-shaped, the upper leg sections 55 each including a tubular journal portion 57 that is journalled on an adjacent one of the transverse shafts 38 intermediate the tubular bearing portions 46 of an adjacent arm structure 41, the leg sections 55 sloping downwardly and rearwardly from their adjacent shafts 38. The leg sections 55 and 56 of each pair thereof are pivotally connected together at adjacent ends, by pivot bolts or the like 58 on axes parallel to the transverse shafts 38, the lower leg sections 56 sloping downwardly and forwardly from the pivot bolts 58, the bolts 58 providing a knee joint between the sections 55 and 56 of each leg 54. The lower front end portions of the lower leg sections 56 are bifurcated to receive therebetween an adjacent one of a plurality of bearing brackets 59 having plate-like portions 60 that are welded or otherwise rigidly secured to the backing section 48 of the slide bar or rail 47. The bifurcated lower front ends of the lower leg sections 56 are pivotally secured to bearing brackets 59 by means of shafts or bolts 61 each underlying an adjacent one of the transverse shafts 38 and parallel thereto.

Each of the arm structures 41 and their associated legs 54 are yieldingly urged in a downward direction of their generally upward and downward swinging movements about the axis of their respective transverse shafts 38 and pivot bolts 58, by means of a pair of torsion springs 62 and another torsion spring 63. The torsion springs 62 each include an intermediate coil portion 64 and opposite end portions or legs 65 and 66, the coil portions 62 loosely encompassing the bearing portions 46 adjacent opposite sides of their associated upper leg portions 55, the generally forwardly projecting legs 65 exerting downward pressure against their adjacent cross bar 45. The legs 66 extend generally rearwardly and engage holders or clips 67 welded or otherwise rigidly secured to opposite sides of the upper leg sections 55 to yieldingly urge the upper leg sections 55 in a downward direction of swinging movement thereof. The cross bars 41 are also provided with retaining members or clips 68 for the spring legs 65. In like manner, the torsion springs 63 each include a coil portion 69 and end portions or legs 70 and 71, each coil portion 69 loosely encompassing a different one of the pivot bolts 58, the leg 70 thereof pressing upwardly against the adjacent upper leg section 55, the leg 71 engaging a clip 72 fast on the adjacent lower leg section 56 to yieldingly urge the associated lower leg section in a downward direction of swinging movement relative to its associated upper leg section 55. Thus, each torsion spring 63 cooperates with its adjacent pair of torsion springs 62 to yieldingly urge the bogie wheels 44 associated therewith and the adjacent portion of the slide bar 47 downwardly into operative engagement with the underlying ground-engaging flight A of the drive track 12 while permitting independent upward and downward movement of the bogie wheels 44 and slide bar 47.

When it is desired to operate the vehicle without the use of the slide bar or rail 47, the slide bar 47 is raised to its inoperative position shown in FIG. 4, and releasably locked therein. While any suitable means may be used for raising the slide bar 47, for the purpose of the present example, a simple screw clamp device is shown in FIGS. 3 and 4 as comprising an elongated screw threaded rod 73 having a hook-like member 74 at one end and a crank equipped tubular nut element 75 screw threaded on its opposite end. The rod 73 and hook-like member 74 are adapted to be inserted through substantially aligned openings 76, 77 and 78 in the slide rail or bar 47, lower leg sections 56 and upper leg sections 55 respectively. As shown, the hook-like member 74 is hooked over the top portion of the upper leg section 55, the tubular nut element 75 being screw threaded against the bottom surface of the slide or wear section 49, rotation of the nut element 75 imparting raising movements to the slide bar 47 and relative angular movements between the leg sections 55 and 56, in a direction to decrease the angle therebetween. The upper leg sections 55 are formed to provide laterally spaced depending lugs 79 which straddle the adjacent lower leg sections 56, the lugs 79 having aligned openings 80 therein disposed below the level of their adjacent lower leg section 56 when the slide bar 47 is raised to its inoperative position. Locking pins or nut equipped bolts 81 are inserted through the aligned openings 80 and engage adjacent lower surface portions of their respective lower leg sections 56 to lock the leg sections 55 and 56 in a slide bar raised position, as shown in FIG. 4.

Means for positively limiting movement of the slide bar or rail 47 in a direction longitudinally of the drive track 12, while permitting raising and lowering movements to be imparted to the slide bar 47, comprises a rigid control link 82 extending generally longitudinally of the drive track and including a pair of control arms 83 each having a front end pivotally connected to a different one of a pair of lugs 84 depending from the front end portions of the reinforcing bars 39, by means of aligned nut-equipped bolts or similar fastenings 85. The control arms 83 converge rearwardly, and have their rear ends pivotally connected to the lower front end of one of the lower leg sections 56, by means of its bolt or shaft 61. The aligned axes of the bolts 85 are parallel to the axes of the transverse mounting shafts 38, so that the link 82 comprising the control arms 83 swings upwardly and downwardly in accordance with upward and downward movement of the slide bar 47. Not only does the control link 82 limit forward and rearward movement of the slide bar or rail 47, but it also braces the slide bar 47 against lateral movement relative to the body structure 1.

It will be noted that the springs 62 and 63 are so disposed that, when the slide bar 47 is in its lowered operative position, the springs 62 are slightly unwound from their condition in the raised position of the slide bar 47. Thus, when the slide bar 47 is lowered to its operative position, the load of the overlying portion of the sled is divided between the bogie wheels 44 and slide bar 47. By thus dividing the load between the slide bar and bogie wheels, frictional load on the slide bar is appreciably reduced, resulting in a substantial increase in the effective life of the slide bar. When the slide bar 47 is raised to its inoperative position of FIG. 4, the springs 62 are wound by the upward swinging movement of the leg sections 55 so that greater yielding bias is applied to the bogie wheels 44 against the lower run A of the drive track 12, to compensate for the loss of support by the slide bar 47. It will be further noted that each of the arm structures 41 is provided with a pair of laterally spaced skid members 85 that are adapted to engage and support the upper return run B of the drive track 12 to prevent the drive track from engaging any sharp corners of the suspension structure when running over uneven terrain which may cause upward and downward movement of the upper run B between the sprocket wheels 18 and 19.

What is claimed is:

1. A drive track suspension system for a vehicle including body structure and an endless flexible drive track defining a lower ground-engaging run and an upper return run upwardly spaced from said lower run, said suspension system comprising:
  (a) a plurality of bogie wheels disposed in spaced relation longitudinally of said drive track between said upper and lower runs and in rolling engagement with said lower run;
  (b) an elongated generally horizontal slide bar extending longitudinally of said track between said upper and lower runs for sliding engagement with said lower run;
  (c) separate mounting means carried by said body structure mounting said bogie wheels and said slide bar for permitting relative independent generally upward and downward movements of said wheels with respect to said bar;
  (d) and yielding means biasing said bogie wheels and slide bar in a generally downward direction of said movements thereof to maintain said bogie wheels and slide bar in rolling and sliding engagement respectively with said lower run of the drive track.

2. The suspension system according to claim 1 in which said bogie wheels are arranged in sets of wheels spaced apart transversely of said drive track, said slide bar being disposed intermediate adjacent bogie wheels of said sets thereof.

References Cited

UNITED STATES PATENTS

| | | | |
|---|---|---|---|
| 984,914 | 2/1911 | Heidenheimer | 280—11 |
| 1,660,101 | 2/1928 | Smyth | 305—27 X |
| 2,419,522 | 4/1947 | Acton | 180—5 |
| 2,284,075 | 5/1942 | Tucker | 180—5 |
| 3,485,312 | 12/1969 | Swenson | 180—5 |

RICHARD J. JOHNSON, Primary Examiner

U.S. Cl. X.R,

180—5